(12) United States Patent
Lösch et al.

(10) Patent No.: US 6,282,335 B1
(45) Date of Patent: Aug. 28, 2001

(54) THERMO-OPTICAL SWITCH (75) Inventors: Kurt Lösch, Stuttgart; Carl Michael Weinert; Norbert Keil, both of Berlin, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/425,016

(22) Filed: Oct. 25, 1999

(30) Foreign Application Priority Data

Oct. 29, 1998 (DE) .............................................. 198 49 862

(51) Int. Cl.⁷ ...................................................... G02F 1/295
(52) U.S. Cl. .................................. 385/16; 385/15; 385/14
(58) Field of Search ................................. 385/16, 15, 14, 385/12.9, 130, 131

(56) References Cited

U.S. PATENT DOCUMENTS

| 5,159,699 | 10/1992 | De Monts . | |
|---|---|---|---|
| 5,173,956 | * 12/1992 | Hayes | 385/16 |
| 6,072,924 | * 6/2000 | Sato et al. | 385/18 |
| 6,122,416 | * 9/2000 | Ooba et al. | 385/16 |
| 6,141,465 | * 10/2000 | Bischel et al. | 385/4 |

FOREIGN PATENT DOCUMENTS

| 0 494 768 B1 | 3/1997 | (EP) . |
|---|---|---|
| 0 905 546 A2 | 3/1999 | (EP) . |

OTHER PUBLICATIONS

Chu, S.T. et la.: "Versatile Stacked Arrow Crossconnect for Three–Dimensional Optical Interconnects" Electronics Letters, GB, IEE Stevenage, Bd. 31, Nr. 1, Jan. 5, 1995, pp. 33–35, XP000504152.

Isamu Kato et al.: "Multistructured Optical IC Elements by Polymer Thin Films" Electronics and Communications in Japan, US, Scripta Technica. New York, Bd. 66, Nr. 2, Feb. 1, 1983.

N. Keil, et al.: "Polymer Waveguide Optical Switch with <–40 dB Polarisation Independent Crosstalk", Electronic Letters, Mar. 28, 1996, vol. 32, No. 7, pp. 655–657.

* cited by examiner

Primary Examiner—Mohammad Sikder
(74) Attorney, Agent, or Firm—Sughrue, Mion, Zinn, Macpeak & Seas, PLLC (57) ABSTRACT

In accordance with the invention, a plurality of glass waveguides (GWL1 . . . GWL4) are arranged in a first plane. In an overlying plane there is arranged at least one polymer waveguide (PWLA) which forms an acute angle with the glass waveguides. Vertical coupling regions are formed where the polymer waveguide intersects the underlying glass waveguides. The coupling properties can be selectively influenced with the aid of heating electrodes (EA1 . . . EA4; EB1 . . . EB4). To switch over light from one glass waveguide into another, the temperature of the vertical coupling regions is set such that light is coupled up from the one glass waveguide into the polymer waveguide, is guided therein, and is coupled down into the desired glass waveguide in another coupling region.

7 Claims, 5 Drawing Sheets

THERMO-OPTICAL SWITCH

BACKGROUND OF THE INVENTION

In currently employed optical communications networks, messages are transmitted via optical fibres whereas the switching of the messages at the network nodes takes place electrically as previously. The messages incoming in the form of optical signals are for this purpose converted by suitable converters into electric signals, switched electrically, and then re-converted into optical signals.

In future optical communications networks, the switching is also to take place optically. In this context one often refers to "transparent" optical communications networks, as the message is transmitted from transmitter to receiver continuously as a light signal. Optical switches are of particular significance in such communications networks. Their function is to switch-over incoming optical signals to one of a plurality of outputs. Optical switches are required to facilitate high switching speeds, to attenuate passing-through light to the least extent possible, and also to be cost-efficient and reliable.

A number of different concepts have been developed for optical switches. Thus for example EP-B1-0 494 768 has disclosed an optical switch wherein a plurality of optical waveguides intersect at right angles in one plane. The intersection points are provided with a groove extending diagonally to the optical waveguides. An oil can be robotically introduced into this groove and sucked out again. Depending upon whether oil is present in the groove or not, a light beam passes through the intersection point or is laterally deflected into the intersecting waveguide. In the case of this known switch, it is possible to form switching matrices with a very large surface area; however the disadvantage exists that the switching speeds are very low due to the required robotic movements.

Another concept for an optical switch is known from an article by N. Keil et al. entitled "Polymer Waveguide Optical Switch With ←40 dB Polarisation Independent Crosstalk", Electronic Letters, Mar. 28, 1996, Vol. 32, No. 7, p. 655–657. The switch described therein is based on the principle of an optical directional coupler. In directional couplers two optical waveguides arranged in one plane extend at a short distance one beside another over a coupling length L. An essential feature of the proposed concept is that the optical waveguides consist of a polymer which exhibits a considerably more marked thermo-optical effect than glass for example. This means that even small temperature changes strongly affect the refractive index of the polymer. With the aid of heating electrodes arranged in the region of the coupling length, the temperature of the two optical waveguides, and thus their refractive index, can be separately controlled. In this way the effective coupling length can be set such that light guided in a waveguide either remains in this waveguide (straight position) or is coupled into the adjacent waveguide (intersecting position). Switches of a higher order (e.g. 4×4 switches) are obtained by cascading a plurality of such 2×2 switches. It is disadvantageous however that in the case of this switch light is guided only in polymer waveguides which, despite having favourable thermo-optical properties, relatively strongly attenuate light of the wavelengths normally used.

JP-1-200 233 A Abstract has disclosed an optical switch in which two different waveguide channels can be operated using one electrode. Here the channels are connected with an intersection.

SUMMARY OF THE INVENTION

Therefore the object of the invention is to provide an optical switch which permits high switching speeds, attenuates passing-through light to the least possible extent, and is simple to produce.

In transparent optical communications systems, optical switches are required to switch-over incoming optical signals to one of a plurality of outputs. The object of the invention is to provide an optical switch which permits high switching speeds, attenuates passing-through light to the least possible extent, and moreover is cost-efficient and reliable.

In accordance with the invention, a plurality of glass waveguides (GWL1 ... GWL4) are arranged in a first plane. In an overlying plane there is arranged at least one polymer waveguide (PWLA) which forms an acute angle with the glass waveguides. Where the polymer waveguide intersects the underlying glass waveguides, vertical coupling regions are formed. The coupling properties can be selectively influenced with the aid of heating electrodes (EA1 ... EA4; EB1 ... EEB4). In order to switch light from one glass waveguide into another, the temperature of the vertical coupling regions is set such that light is coupled up from the one glass waveguide into the polymer waveguide, guided therein, and coupled down into the desired glass waveguide in another coupling region.

A number of glass waveguides are arranged in a first plane. In an overlying plane there is arranged at least one polymer waveguide which forms an acute angle with the glass waveguide. Vertical coupling regions are formed where the polymer waveguide intersects the underlying glass waveguides. The coupling properties in these regions can be influenced by reducing the temperature of the polymer waveguide core therein. For this purpose heating electrodes are arranged on the upper side of the switch.

If light is to be switched from one glass waveguide into another, the temperature of the vertical coupling regions is set such that light is coupled up from the one glass waveguide into the polymer waveguide, guided therein, and coupled down into the desired glass waveguide in another coupling region.

The switch according to the invention combines the following advantages:
a) As the thermo-optical effect in polymers is very marked, only small switching powers are required. The quantity of heat to be discharged is correspondingly small.
b) Due to the combination of glass- and polymer waveguides according to the invention, the attenuation of the switch is very low. This is due in particular to two causes:
i) Light is mainly guided in glass waveguides which have a very low attenuation in the wavelength ranges used for optical communications. In the polymer waveguides in which the attenuation is higher, the light is guided only across a short distance.
ii) In known switches based on the principle of directional couplers, the coupling region is located in one plane. The coupling region is the region in which the two optical waveguides are arranged at such a close distance relative to one another that cross-coupling is possible. This close arrangement inevitably requires the optical waveguides to possess curved portions. However, curves disadvantageously affect the properties of the waveguide as either light losses occur or the waveguide cross-section must be reduced by setting a higher refractive index difference between waveguide core and waveguide cladding. A reduced waveguide cross-section leads however to mismatching of the modal fields upon the coupling of the waveguide to an optical fibre, whereby the attenuation properties of the switch are impaired. On the other hand, the switch according to the invention can also be constructed without curved portions as here polymer waveguide and glass waveguides intersect in two different planes.

c) Costly materials, such as for example lithium niobate, gallium arsenide or indium phosphide on which many known switches are based, are not required.

Here the terms "glass waveguide" and "polymer waveguide" relate only to the corresponding waveguide cores. A glass waveguide is thus an optical waveguide whose waveguide core consists of glass. Similar applies to the at least one polymer waveguide. For the functioning of the switch according to the invention, the material from which the waveguide cladding layers are in each case composed is basically immaterial. It should merely be ensured that here again the difference in refractive index between waveguide core and waveguide cladding required for the optical wave guidance is adhered to.

In an advantageous exemplary embodiment of the invention, a polymer layer is arranged between the waveguide cores of the at least two glass waveguides and the waveguide core of the at least one polymer waveguide. Such an arrangement exploits the fact that polymers have only a comparatively low thermal conductivity. The waveguide core of the polymer waveguide thus is thermally well insulated from the underlying glass layers. Consequently only a small part of the heat generated by the heating electrode is discharged unused in the direction of the glass waveguides.

In the switch according to the invention, the refractive indices of the glass waveguides and of the at least one polymer waveguide are to be set very precisely. This setting can be aided by the provision of means for regulating the temperature of the overall optical switch. These means can for example have the form of a controllable heating element on which is arranged a substrate bearing the optical switch. Since, as already mentioned in the foregoing, the thermo-optical effect of glass and of polymers is different, the difference between the respective refractive indices can be accurately adjusted by changing the temperature of the overall arrangement. The arrangement is thus less sensitive to production tolerances.

In another advantageous exemplary embodiment of the invention, in the coupling regions the at least one polymer waveguide intersects the at least two glass waveguides such that an angle of between 0.2° and 1.2° is formed. It has been shown that particularly favourable switching properties, in particular low cross-talk, are attainable at these values.

In yet another exemplary embodiment, the at least one polymer waveguide is curved in an s-formation between the coupling regions. As a result the space requirement of the switch can be considerably reduced. The impairment of the wave guidance properties is tolerable here provided the curvatures are not too great.

BRIEF DESCRIPTION OF THE DRAWINGS

In the following the invention will be explained in detail in the form of the exemplary embodiments making reference to the drawings in which.

DESCRIPTION OF THE EMBODIMENT

Figure 1:
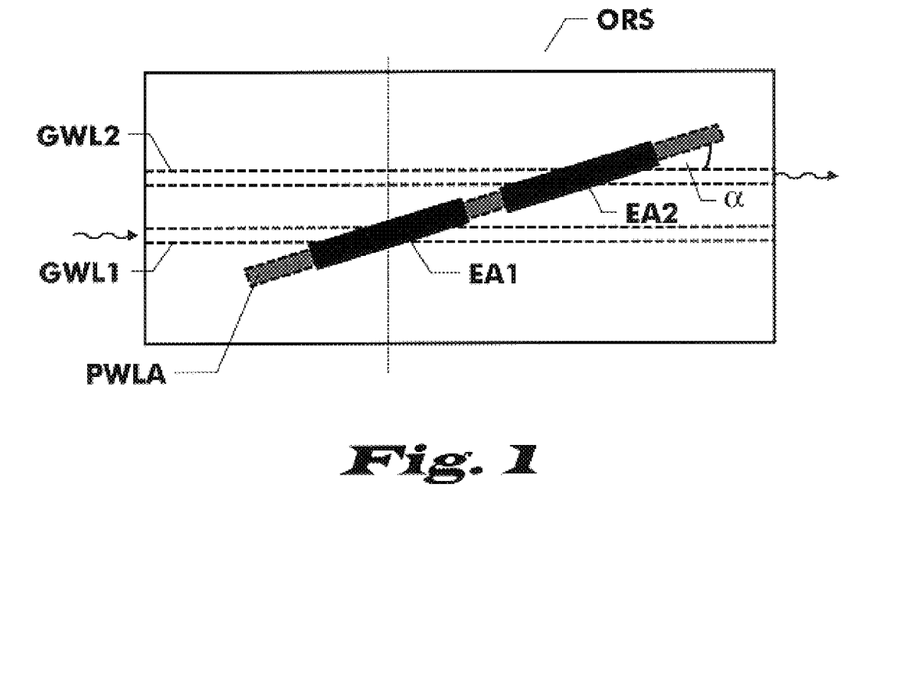
FIG. 1 is a plan view of a 1×2 switch according to the invention (not to scale)
Figure 2:
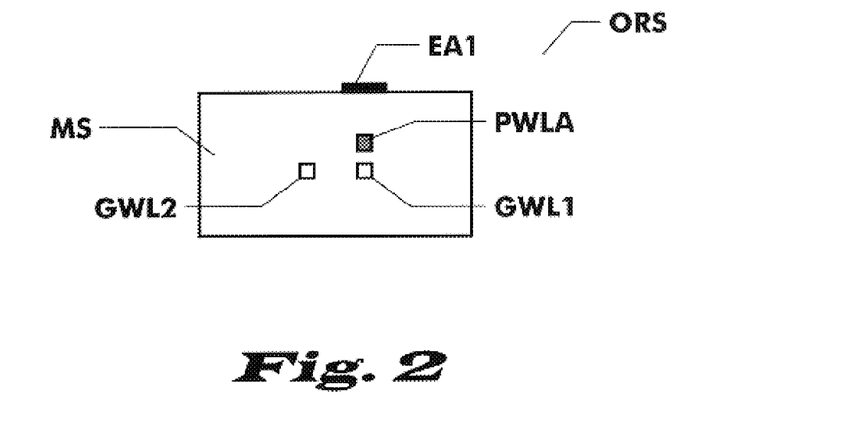
FIG. 2 is a lateral section through the 1×2 switch according to the invention shown in FIG. 1 (not to scale)

In the following a first exemplary embodiment of a switch ORS according to the invention will be explained with reference to FIGS. 1 and 2. FIG. 1 is a plan view, while FIG. 2 is a lateral section through the plane shown in broken lines in FIG. 1. FIG. 2 illustrates two optical waveguides GWL1 and GWL2 which are formed by waveguide cores and by a cladding layer MS surrounding these cores. The waveguide cores have not been provided with individual reference symbols; instead the reference symbols for the optical waveguides in the drawings basically relate to their cores as these determine the geometric shape of the optical waveguides.

The cores of the optical waveguides GWL1 and GWL2 are composed of glass, for which reason these optical waveguides will be referred to in brief in the following as glass waveguides. The glass can optionally contain additives such as germanium or phosphorus for selectively changing the refractive index. It is unnecessary to use a specific type of glass for the design according to the invention.

To ensure that light guidance occurs in the glass waveguides GWL1 and GWL2, the refractive index of the cladding layer MS must be lower than that of the cores of the glass waveguides GWL1 and GWL2. No other basic requirements are imposed upon the material properties of the cladding layers MSG and MSP. In the following, making reference to FIGS. 3, 4 and 5 it will be described how the cladding layer can be particularly constructed.

In FIG. 2 it can be seen that the cores of the glass waveguides GWL1 and GWL2 have a rectangular cross-section. Other cross-sectional shapes, e.g. oval, are also conceivable in principle. As the glass waveguides GWL1 and GWL2 are arranged in one plane, one also refers to planar optical waveguides.

FIG. 2 also illustrates a waveguide PWLA. The core of this waveguide PWLA consists of a polymer, for which reason it will be referred to as polymer waveguide in the following. Here suitable polymers consist for example of polymethylmethacrylate (PMMA) or benzocyclobutene (BCB). In the illustrated exemplary embodiment the core of the polymer waveguide PWLA is embedded in the same cladding layer MS as the cores of the glass waveguides GWL1 and GWL2. Here again it should simply be ensured that the cladding layer MS has a lower refractive index than the core of the polymer waveguide PWLA.

The polymer waveguide PWLA is arranged in a plane parallel to the plane defined by the glass waveguides GWL1 and GWL2. In FIG. 2 the polymer waveguide PWLA thus extends across the glass waveguides GWL1 and GWL2. Here it is an essential feature of the invention, as clearly visible in FIG. 1, that the polymer waveguide PWLA is arranged obliquely to the glass waveguides GWL1 and GWL2. This gives rise to vertical coupling regions at the locations at which the polymer waveguide PWLA in each case intersects the glass waveguides GWL1 and GWL2. The angle between the polymer waveguide PWLA and the glass waveguides GWL1 and GWL2 is referenced a in FIG. 1.

The section shown in FIG. 2 extends through one of the two coupling regions formed by the polymer waveguide PWLA with the glass waveguides GWL1 and GWL2 in the illustrated exemplary embodiment. In the coupling region the polymer waveguide PWLA comes so close to the glass waveguide GWL1 that, if the geometric dimensions of the coupling region and the refractive indices of the waveguides have been suitably selected, light can be fully coupled from the glass waveguide GWL1 into the polymer waveguide PWLA. In the illustrated exemplary embodiment this selection is such that light guided in the glass waveguide GWL1 only partially issues therefrom in the coupling region, and the output-coupled part is fully coupled back into the glass waveguide GWL1 over the length of the coupling region. Thus all of the light ultimately remains in the glass waveguide GWL1. The coupling region is thus in the straight position.

In accordance with the invention, means are also provided for changing the temperature of the waveguide core of the polymer waveguide in the coupling regions. In the illustrated exemplary embodiment these means have the form of metallic heating electrodes EA1 and EA2 which are arranged on the upper side of the optical switch. The exact geometry is only of subordinate significance here; it must simply be ensured that the temperature can be increased in the coupling regions. Alternatively to the heating electrodes, in principle it is also possible to provide cooling elements, e.g. in the form of Peltier coolers. It is only important that the temperature of the polymer waveguide cores can be selectively changed in the coupling regions. By means of a temperature change it is then possible to change the coupling properties of the particular coupling region via the thermo-optical effect.

In the illustrated exemplary embodiment the geometric dimensions of the coupling region and the refractive indices of the waveguides have been selected such that in the event of a slight increase in temperature of the polymer waveguide PWLA, its core has the same refractive index as the core of the glass waveguide. Light guided in the glass waveguide GWL1 then is fully coupled across into the polymer waveguide PWLA. If the same conditions prevail in the other coupling region, the light is coupled down into the glass waveguide GWL2 therein. This light path is indicated in FIG. 1 by two arrows on both sides of the switch. In this way a light beam guided in the glass waveguide GWL1 can be switched over to one of two outputs via the heating current supplied to the heating electrode EA1.

If light is only to be switched over between the two outputs, a second heating electrode EA2 is not required in this exemplary embodiment. In the case of a simple 1×2 switch, this second heating electrode is only required if the switch is also to possess the function of extinguishing a light beam. This can be achieved if the first coupling region, which can be influenced by the heating electrode EA1, is in the intersecting position and the other coupling region is in the straight position. The light guided in the polymer waveguide PWLA then passes to the end of the waveguide where, provided this end is appropriately formed (tapered etc.), it is irradiated into the cladding layer.

In general, the underside of the cladding layer MS will be arranged on a carrier (not shown) which can consist for example of a silicon crystal or a ceramic. However it is also possible for the side of the cladding layer MS which bears the heating electrodes EA1 and EA2 to be connected to a carrier. This is not essential to the invention.

Figure 3:
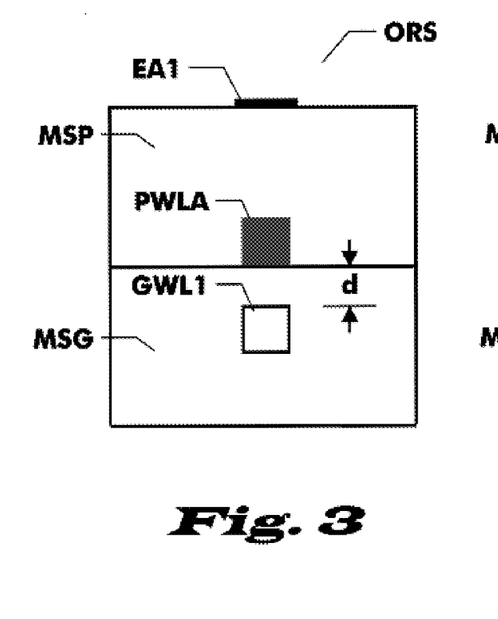
FIG. 3 is a lateral section through a variant of the switch according to the invention (partial view)
Figure 4:
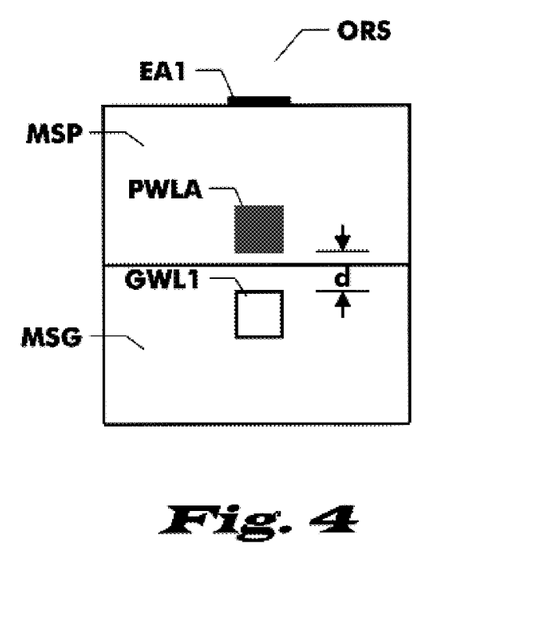
FIG. 4 is a lateral section through another variant of the switch according to the invention (partial view)
Figure 5:
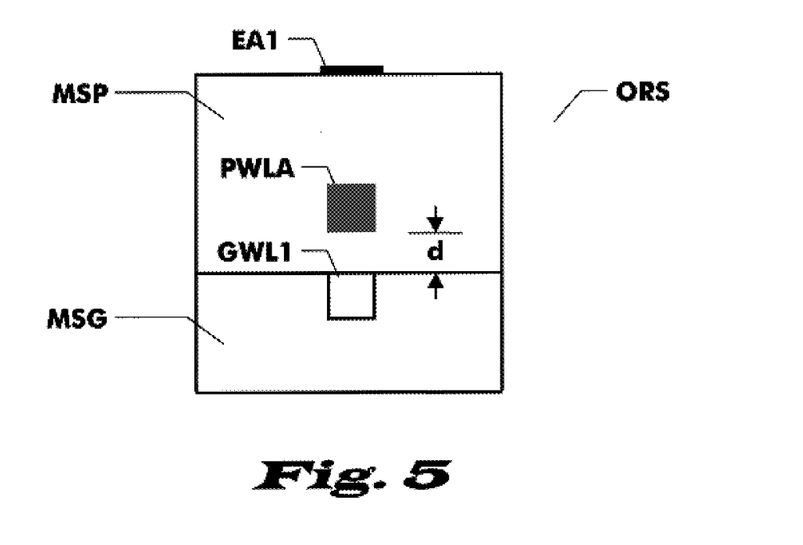
FIG. 5 is a lateral section through another variant of the switch according to the invention (partial view)

FIGS. 3, 4 and 5 are lateral sectional diagrams of further exemplary embodiments of the invention in which the cladding layer is subdivided into two subsidiary cladding layers MSG and MSP. The cladding layer MSG is composed of glass, while the cladding layer MSP is composed of a polymer. For reasons of clarity, only one glass waveguide GWL1 has been shown. In all the illustrated variants the vertical distance d between the glass waveguide GWL1 and the polymer waveguide PWLA is identical.

In the variant shown in FIG. 3, the glass waveguide GWL1 is completely surrounded by the glass cladding layer MSG. On its underside the core of the polymer waveguide PWLA directly adjoins the glass cladding layer MSG. The other boundary surfaces of the core are surrounded by the polymer cladding layer. In the variant shown in FIG. 4, both the glass waveguide GWL1 and the polymer waveguide PWLA are completely surrounded on all sides by the glass cladding layer and polymer cladding layer respectively. The variant shown in FIG. 5 represents, as it were, the counterpart to the variant shown in FIG. 3. Here the core of the polymer waveguide PWLA is completely surrounded by a polymer cladding layer MSP. On its upper side the core of the glass waveguide GWL1 adjoins the polymer cladding layer MSP; the other boundary surfaces of the core are surrounded by the glass cladding layer.

Which of the variants is to be preferred in a particular situation depends i.a. upon the production processes to be employed. However, the direct contact between the core of the polymer waveguide PWLA and the glass cladding layer MSG causes heat, which has been generated by the heating electrode EA1 and has entered the core, to be undesirably discharged through the glass cladding layer MSG which has a comparatively high thermal conductivity. On the other hand, in the variants shown in FIGS. 4 and 5 a polymer layer thermally insulating the two waveguides from one another is arranged between the polymer waveguide and the glass waveguide. Consequently a switch constructed in this way can be operated with lower heating currents.

In the following some functional aspects of the invention will be explained in detail making reference to the diagrams in FIGS. 6 and 7. Model calculations have shown that the coupling behaviour is dependent in particular upon the following parameters:

a) the distance d in the vertical direction between the glass waveguide GWL1 and the polymer waveguide PWLA;

b) the refractive index of the cladding layers;

c) the angle α formed by the polymer waveguide with the glass waveguide in the coupling region;

d) the difference in refractive index Δn between the cores of the glass waveguides on the one hand and of the polymer waveguide on the other hand.

In an exemplary embodiment of the invention a small refractive index difference Δn (order of magnitude: $1 \cdot 10^{-3}$) is set, which does not disappear until the temperature of the polymer waveguide core is increased by means of a heating element. The lower the refractive index difference Δn is, the less heat must be supplied to cause the refractive index difference to disappear, and the higher are the attainable switching speeds. FIGS. 6 and 7 illustrate how the transmission of the glass waveguide GWL1 changes over the length L of the coupling region. Three curves, representing the results for different angles α, have in each case been shown. The other parameters referred to in the foregoing are the same in all of the illustrated examples.

Figure 6:
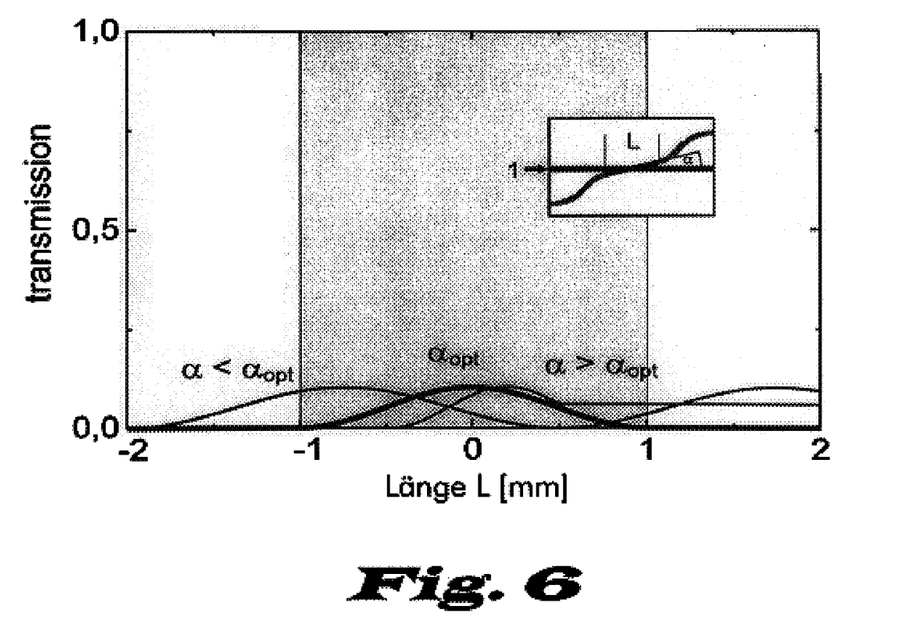
FIG. 6 is a diagram in explanation of the coupling behaviour of a coupling region in the straight state.

In FIG. 6 it has been assumed that the cores of the glass waveguide and of the polymer waveguide possess the same temperature. This corresponds to a refractive index difference $\Delta n =,/0$. In the case of an optimally selected angle $\alpha_{opt}$, over the coupling length L a part of the light is coupled into the polymer waveguide PWLA and fully back again (straight position). If the angle is not optimally selected, the light is not fully coupled back into the glass waveguide GWL1.

Figure 7:
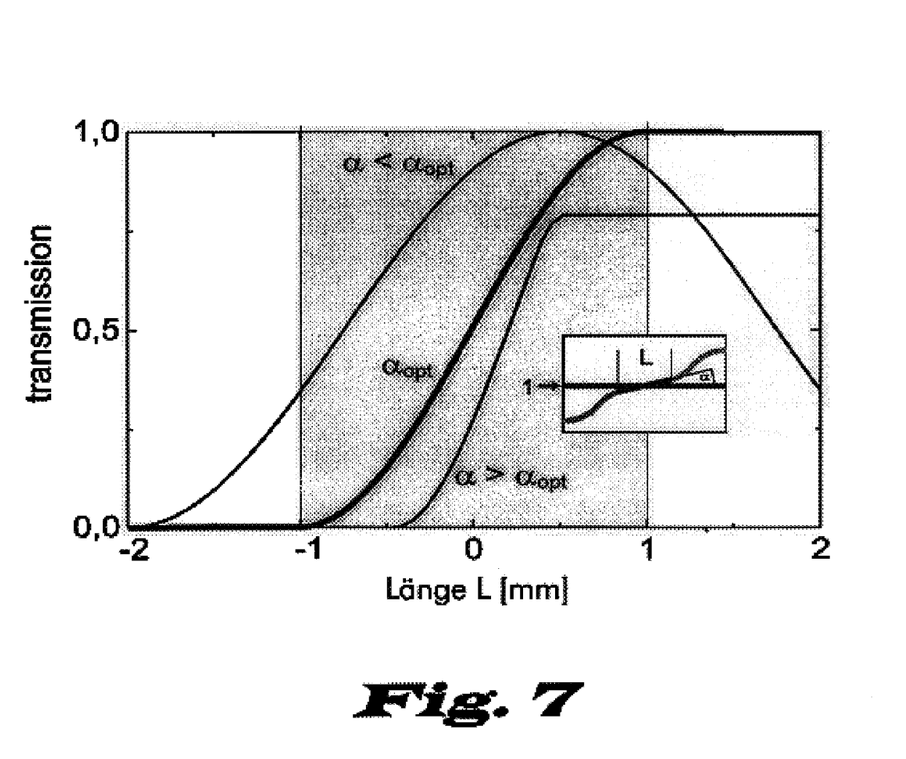
FIG. 7 is a diagram in explanation of the coupling behaviour of a coupling region in the intersecting state.

In FIG. 7 it has been assumed that the core of the polymer waveguide PWLA has a higher temperature than the core of the glass waveguide GWL1. The increase in temperature is precisely such that the refractive index difference $\Delta n$ disappears. If the angle $\alpha$ is optimally selected, all of the light guided in the glass waveguide GWL1 is coupled into the polymer waveguide PWLA (intersecting position). If the angle is not optimally selected, either the light is partially coupled back again or is not fully coupled into the polymer waveguide PWLA in the first place.

The optimal angle $\alpha_{opt}$ may differ however in the two cases. As $\alpha_{opt}$ is dependent upon the other stated parameters, an angle permitting optimal coupling behaviour both in the straight and the intersecting position can be found either on the basis of model calculations or empirically. The optimal transmission behaviour in the two switching states illustrated in FIG. 6 and 7 thus can only be achieved for an optimised combination of the stated parameters. Model calculations have shown that, with different sets of parameters, the optimal angle $\alpha_{opt}$ ranges between 0.2° and 1.2°.

If in the unheated state (straight position) the actual refractive index difference $\Delta n$ deviates from its setpoint value, a part of the light is permanently coupled into the polymer waveguide, manifesting as telecommunications cross-talk. Therefore particular attention should be paid to adhering to the optimal refractive index difference $\Delta n$. The model calculations show that the tolerances to be adhered to can consistently be in the order of $5 \cdot 10^{-4}$. Such narrow tolerances can be achieved by very careful selection and treatment of materials.

In the case of another possibility of setting the optimal refractive index difference $\Delta n$, in accordance with the invention means are provided for regulating the temperature of the overall optical switch. This exploits the fact that the thermo-optical effects in glass and polymers differ in strength and moreover are mutually opposed. By regulating the temperature of the switch it is thus possible to directly set the optimal refractive index difference $\Delta n$. For this purpose it would be conceivable, for example, to arrange the switch on a heating element which ensures uniform heating of the switch. It would also be possible to accommodate the switch in a heatable housing.

Here it should be noted that it is also possible to achieve the two switching states in the coupling regions in a different manner. The stated parameters can also be such that a coupling region assumes the intersecting position in the unheated state and the straight position in the heated state.

Figure 8:
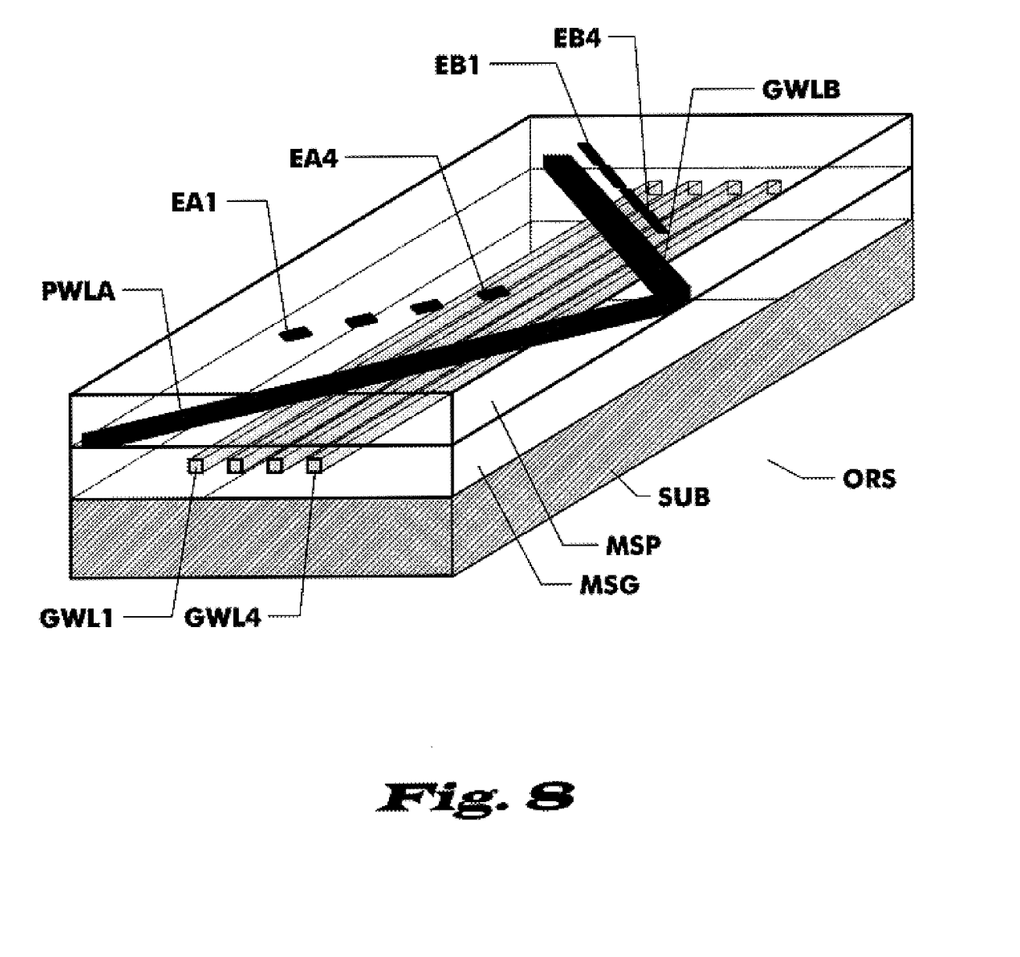
FIG. 8 is a perspective view of a 4×4 switch according to the invention (not to scale)

FIG. 8 is a perspective view of a 4×4 switch. A glass cladding layer MSG, in which four glass waveguide cores form glass waveguides GWL1 . . . GWL4, is arranged on a substrate SUB serving as carrier. Above the glass cladding layer GMS is arranged a polymer cladding layer MSP in which a polymer waveguide PWLA is embedded. The polymer waveguide PWLA is shaped such that each glass waveguide GWL1 . . . GWL4 is intersected once at the angle a and once at the complementary angle thereto. The intersection angles have been greatly exaggerated in FIG. 8 however. The overlapping of the waveguides in the vertical direction gives rise to 2×4=8 coupling regions. These can be switched independently of one another with the aid of heating elements EA . . . EA4 and EB1 . . . EB4 arranged on the polymer cladding layer MSP. As can easily be deduced from FIG. 7, by means of this switch, light can be bidirectionally switched over from every glass waveguide GWL1 . . . GWL4 into any other glass waveguide GWL1 . . . GWL4. When light of a different but closely adjacent wavelength is guided in the glass waveguides GWL1 . . . GWL4 (wavelength multiplexing) this light can also be jointly guided in the polymer waveguide PWLA without serious disturbances occurring. In this arrangement all the optical waveguides are straight so that no losses occur due to waveguide curvatures.

Figure 9:
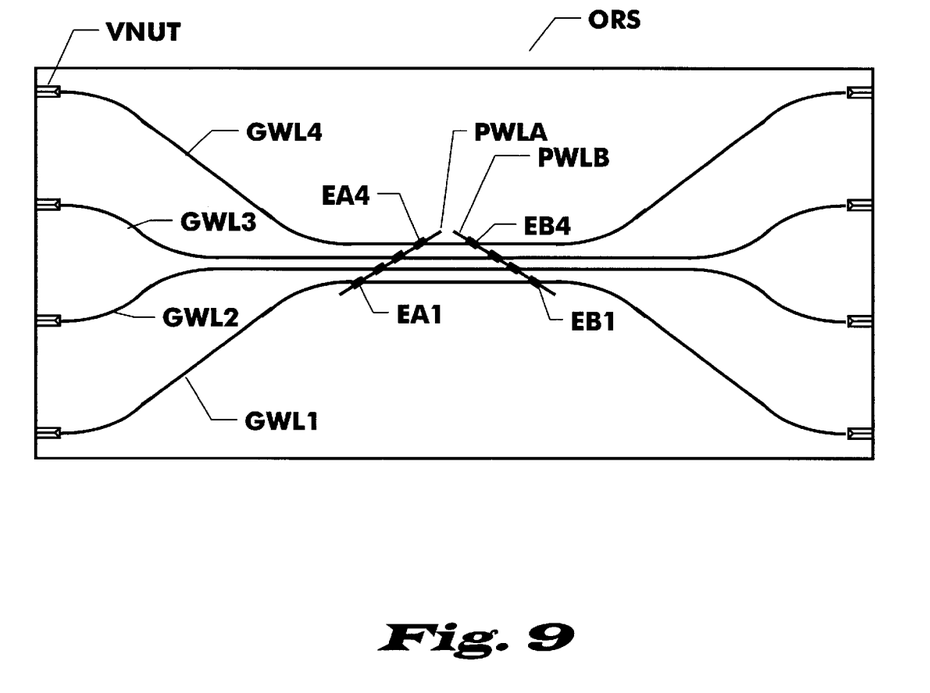
FIG. 9 is a plan view of a 4×4 switch according to the invention with connection points for optical fibres.

FIG. 9 illustrates a possibility whereby the glass waveguides GWL1 . . . GWL4 can be connected to optical fibres. Apart from the actual switching region, the glass waveguides GWL1 . . . GWL4 are weakly curved in order thus to allow a larger spacing between the connection points. The connection points have the form of V-grooves VNUT into which optical fibres are insertable. In contrast to the exemplary embodiment shown in FIG. 8, the bent polymer waveguide PWLA shown therein has been replaced here by two individual, straight polymer waveguides PWLA and PWLB.

Figure 10:
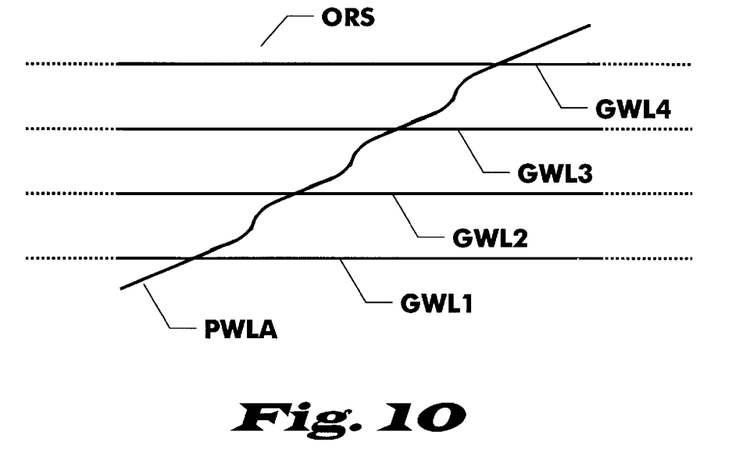
FIG. 10 is a schematic diagram of another exemplary embodiment in which the polymer waveguide is curved between the coupling regions.

In the exemplary embodiment illustrated in FIG. 10—not to scale—the polymer waveguide PWLA is not straight throughout, but only in the coupling regions. In between, the polymer waveguide PWLA is curved in an s-formation. The space requirement of the optical switch can be reduced in this way. However this space saving is generally acquired at the expense of light losses caused by the curvatures. The heating electrodes have not been illustrated here for reasons of clarity. In the production of a switch according to the invention it is entirely possible to resort to the use of known methods of producing glass- and polymer waveguides. In this connection reference will again be made to the above mentioned publication by N. Keil in which further bibliographical references are given.

What is claimed is:

1. A thermo-optical switch comprising:

two planar optical glass waveguides which are arranged in a first plane of the switch and in which at least the core consists of glass;

at least one planar optical polymer waveguide which is arranged in parallel in a second plane parallel to the first plane and which extends obliquely relative to the two glass waveguides and intersects the two glass waveguides so that at the intersection points coupling regions are formed in the direction at right angles to the planes, and wherein at least the waveguide core consists of a polymer and means by which the temperature of the waveguide core of the at least one polymer waveguide can be changed in the coupling regions.

2. A thermo-optical switch according to claim 1, wherein a polymer layer is arranged between the waveguide cores of the at least two glass waveguides and the waveguide core of the at least one polymer waveguide.

3. A thermo-optical switch according to claim 1, wherein the means by which the temperature of the at least one polymer waveguide can be changed in the coupling regions are heating electrodes.

4. A thermo-optical switch according to one of claims 1 or 2, wherein means are provided for regulating the temperature of the overall switch.

5. A thermo-optical switch according to claim 1, wherein in the coupling regions the at least one polymer waveguide intersects the at least two glass waveguides in such manner that an angle ($\alpha$) of between 0.2° and 1.2° is formed therewith.

6. A thermo-optical switch according to claim 1, wherein in the coupling regions the at least two glass waveguides and the at least one polymer waveguide are straight.

7. A thermo-optical switch according to claim 1, wherein the at least one polymer waveguide is curved in an s-formation between the coupling regions.

* * * * *